United States Patent
Reichenbach et al.

(10) Patent No.: US 6,315,201 B1
(45) Date of Patent: Nov. 13, 2001

(54) METHOD AND APPARATUS FOR THE READING OF A BAR CODE CONSISTING OF A DEFINED NUMBER OF CODE ELEMENTS

(75) Inventors: Jürgen Reichenbach, Emmendingen; Heinrich Hippenmeyer, Freiamt, both of (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 09/126,429

(22) Filed: Jul. 30, 1998

(30) Foreign Application Priority Data

Aug. 6, 1997 (DE) .............................. 197 34 031

(51) Int. Cl.[7] .............................. G06K 5/04; G06K 7/10; G06K 9/32
(52) U.S. Cl. .............................. 235/462.08; 235/462.2
(58) Field of Search .............................. 235/462.08, 462.02, 235/462.12, 462.16, 383, 454

(56) References Cited

U.S. PATENT DOCUMENTS

| | | | |
|---|---|---|---|
| 4,272,675 | * 6/1981 | Blanford et al. | 235/463 |
| 5,028,772 | * 7/1991 | Lapinski et al. | 235/467 |
| 5,194,722 | * 3/1993 | Mergenthaler et al. | 235/463 |
| 5,237,163 | * 8/1993 | Collins, Jr. et al. | 235/472 |
| 5,252,814 | * 10/1993 | Tooley | 235/383 |
| 5,262,623 | * 11/1993 | Batterman et al. | 235/454 |
| 5,262,625 | * 11/1993 | Tom et al. | 235/462 |
| 5,262,626 | * 11/1993 | Goren et al. | 235/462 |
| 5,276,316 | * 1/1994 | Blanford | 235/462 |
| 5,278,398 | * 1/1994 | Pavlidis et al. | 235/462 |
| 5,296,691 | * 3/1994 | Waldron et al. | 235/462 |
| 5,367,578 | * 11/1994 | Golem et al. | 382/12 |
| 5,444,231 | * 8/1995 | Shellhammer et al. | 235/462 |
| 5,453,600 | * 9/1995 | Swartz | 235/375 |
| 5,457,308 | * 10/1995 | Spitz et al. | 235/462 |
| 5,466,921 | * 11/1995 | Lapinski et al. | 235/462 |
| 5,481,098 | * 1/1996 | Davis et al. | 235/462 |
| 5,493,108 | * 2/1996 | Cherry et al. | 235/454 |
| 5,495,097 | * 2/1996 | Katz et al. | 235/462 |
| 5,583,331 | * 12/1996 | Dvorkkis | 235/462 |
| 5,596,446 | * 1/1997 | Plesko | 359/214 |
| 5,656,805 | * 8/1997 | Plesko | 235/472 |
| 5,870,219 | * 2/1999 | Plesko | 359/199 |
| 5,900,610 | * 5/1999 | Kelly, Jr. | 235/385 |

FOREIGN PATENT DOCUMENTS

| | | |
|---|---|---|
| 3813725A1 | 11/1989 | (DE) . |
| 19711873A1 | 9/1998 | (DE) . |
| 407200719 | * 8/1995 | (JP) .............................. G06K/7/10 |
| WO 94/07213 | 3/1994 | (WO) . |

* cited by examiner

Primary Examiner—Karl D. Frech
(74) Attorney, Agent, or Firm—Townsend and Townsend and Crew LLP

(57) ABSTRACT

A method of reading of a bar code consisting of a predetermined number of code elements for the generation of a binary signal with sequential high/low phases, the length of which correspond to the widths of the sequential code elements. The bar code is sensed by at least two scanning beams from different directions along different scanning lines. At least some of the regions of the bar code are scanned by a scanning beam and are respectively detected as a code segment, and wherein at least some of the detected code segments are selected with respect to predetermined decision criteria and combined for the reconstruction of the scanned bar code. Furthermore an apparatus is described for carrying out the method.

24 Claims, 2 Drawing Sheets

METHOD AND APPARATUS FOR THE READING OF A BAR CODE CONSISTING OF A DEFINED NUMBER OF CODE ELEMENTS

The present invention relates to a method of reading a bar code consisting of a predetermined number of code elements for the generation of a binary signal with sequential high-low phases, the lengths of which correspond to the widths of the sequential code elements. Furthermore, the invention is directed to an apparatus for carrying out such a method.

BACKGROUND OF THE INVENTION

Methods of this kind are used together with bar code readers, with the bar code reader transmitting a scanning beam in the direction of the bar code to be detected. The scanning beam is, for example, deflected via a rotating, polygonal mirror wheel, so that the scanning beam is periodically swept through a scanning angle. Through the moving scanning beam a scanning line is projected onto the object carrying the bar code, i.e. onto the bar code.

Most known methods require, for the successful decoding of a bar code, that the scanning beam sweeps over the bar code over its entire length. This condition is, however, no longer satisfied when the bar code to be detected is so tilted relative to the scanning direction that the scanning line projected onto the bar code no longer covers the bar code over its full length. This can, for example, be the case when the bar code is located on an article of luggage which is transported on a conveyor belt. The bar code can in this respect adopt any desired position, so that it is not ensured that a scanning beam sweeping over the object sweeps over the bar code over its full length.

In order to increase the probability of decoding it is thus published German patent application DE-A-107 118 73 that a bar code which is moving obliquely to the scanning direction should be multiply scanned by the same scanning beam, so that different adjacent regions of the bar code are obliquely swept over by the scanning beam as a result of the relative movement between the bar code and the scanning line.

The code segments of the bar code which are respectively detected during this, are combined in an image memory into a complete bar code, with the association of the code element sections respectively forming the same code element of the bar code and detected by the oblique scanning taking place by determining the angle of tilting, the so-called tilt angle, between the scanning direction and the longitudinal direction of the bar code. Once the bar code has been fully built up in the image memory, it is decoded with conventional methods.

All these methods have the common feature that for a successful detection and decoding of the bar code the latter is swept over by a scanning beam of a single bar code reader either in one passage, or, with oblique scanning, in a plurality of directly sequential passages along parallel scanning lines.

A problem exists in that bar codes which are not completely readable from the direction of the bar code reader cannot be fully detected and are thus not decodable with this method, for example due to a partial obscuring of the bar code, because of a bent or kinked bar code, because of an unfavorable reading angle, or because of a partly destroyed bar code.

BRIEF SUMMARY OF THE INVENTION

It is thus an object of the invention to design a method of the initially named kind in such a way that the detection and decoding probability is further increased even in the above-named problematic cases. Furthermore, an apparatus should be set forth for carrying out such a method.

The object with regard to the method is satisfied, starting from the method of the initially named kind, in accordance with the invention in that the bar code is sensed by at least two scanning beams from different directions along different scanning lines, in that at least some of the regions of the bar code scanned by a scanning beam are respectively detected as a code segment, and in that at least some of the detected code segments are selected with respect to predetermined decision criteria and combined for the reconstruction of the scanned bar code.

An apparatus formed in accordance with the invention is comprised by at least two bar code readers which transmit one or more scanning beams in different directions along different scanning lines for the scanning of the bar code, by a code segment detection unit for detecting at least some of the regions of the bar code scanned by a scanning beam as a respective code segment, and by a central evaluation unit for checking predetermined decision criteria for at least some of the detected code segments and for the selection and combination of some of the checked code segments for the reconstruction of the scanned bar code in dependence on the result of the check.

Thus, the problem that the bar code is not fully swept over by one scanning beam, be it in one or more scans, is solved in accordance with the invention in that a plurality of scanning beams sweep over the object bearing the bar code from different directions along different scanning lines. If the bar code cannot be swept over by the corresponding scanning beam from one direction, i.e. along its longitudinal axis, or in several parts oblique to its longitudinal axis, then the possibility exists that the part of the bar code which could not be swept over, can be swept over from a different direction by one of the other scanning beams.

Since it is possible that a plurality of different bar codes are present on the object carrying the bar code, the detected code segments are checked with respect to predetermined decision criteria to see whether they represent segments of the same bar code so that only code segments which belong together are combined for the reconstruction of the scanned bar code. The thus completely detected bar code can subsequently be decoded by customary methods.

It is basically also possible for the same bar code to be multiply present on the object, for example for reasons of redundancy. In this case it is possible, with the method of the invention, to combine one code segment or several code segments of the scanned bar code with one or more code segments of another scanned bar code bearing the same information in order, in this manner, to reconstruct the full bar code present at different points of the object.

In accordance with another advantageous embodiment of the invention, scanning beams are transmitted from different bar code readers, in particular from bar code readers which are spatially separated from one another. In this embodiment a plurality of bar code readers can be so arranged in the room that a detection of the bar code takes place from essentially all relevant directions. In this manner all possible orientations of the bar code are covered, so that each region of the bar code can be swept over by at least one of the scanning beams of the bar code reader.

It is, however, also possible for the scanning beams to be produced and transmitted from one bar code reader, for example by division and/deflection of a scanning beam. Through the special design of a bar code reader, in which a scanning beam is, for example, divided via one or more semipermeable mirrors into a plurality of scanning beams, the number of the bar code readers required can be reduced. However, a bar code reader of this kind is, on the one hand, more complicated to manufacture and, on the other hand, the adjustment of such a bar code reader and any possibly required deflection devices are difficult in practice.

In a further preferred embodiment, the detected code segments are supplied to a central evaluation unit, through which the decision criteria are checked. The code segments selected as a result of the check are combined. In this arrangement one of the bar code readers can be used as the evaluation unit or a unit formed separately from the bar code readers can be used as the evaluation unit.

Through the central evaluation unit the code segments detected by the different bar code readers can be checked to see whether they are parts of the same bar code in accordance with the predetermined decision criteria. A complicated communication and synchronization between different evaluation units is thus avoided.

In accordance with a further advantageous embodiment of the invention, the detected code segments are combined in all possible combinations and respectively checked to see whether they satisfy predetermined decision criteria.

It is, however, basically also possible for specific combinations to be precluded from the outset, on the basis of specific decision criteria which are checked for the individual code segments. In just the same way, the arrangement of detected code segments can be predetermined as a result of specific decision criteria.

In accordance with a further preferred embodiment of the invention a determination is made for each detected code segment of its spatial position, in each case at the point in time at which it is scanned and code segments are recognized as parts of the same scanned bar code and combined in dependence on the positions that are found.

In this respect the code segments are in particular respectively combined, whose spatial positions correspond within predetermined boundary values.

In this manner it is ensured, with high probability, that only those code segments are combined which are swept over by different scanning beams and detected by the bar code readers and which represent parts of the same bar code.

In the event that a relative movement takes place between the bar code and the bar code reader or the bar code readers, for example when the bar code preferably moves on a conveying device, then account is taken in accordance with a further advantageous embodiment of this relative movement in the determination or evaluation of the spatial positions. If the bar code is swept over by different scanning beams at different points in time, then its position in space relative to the bar code reader or the bar code readers has changed in the meantime as a result of the relative movement. In accordance with the invention this change of the spatial position is compensated so that the different scanned code segments can again be recognized as parts of the same bar code.

A distance value representative for the path of the respective code segment traveled from a reference time point is preferably determined for each detected code segment, in particular from a reference time point which is the same for all code segments, and is in each case taken into account in the determination or evaluation of the spatial position of the code segment and is in particular subtracted from the component of the detected spatial position parallel to the direction of movement.

Through the determination of this distance value the path traveled by the bar code as a result of the relative movement between different scans is compensated in such a way that the respectively compensated positions of the code segments can be directly compared with one another.

An incremental clock signal is advantageously started in this arrangement at the reference time point and the incremental count is used as a distance value at the time point of the scan. In this manner the distance value can be determined by very simple technical means. The frequency of the incremental clock signal thereby corresponds to the speed of movement of the bar code, with the signal preferably being binary coded, so that a simple evaluation is possible. Basically, the incremental clock signal can already be started prior to the reference time point, so that in this case only an offset needs be taken into account.

If the relative speed between the bar code and the bar code reader or the bar code readers is constant, then the time which has elapsed between the individual scans can also be simply determined instead of the determination of the incremental count. As a result of the constant relative speed, the path traveled by the bar code during this time can then be determined from the measured time.

Three Cartesian position coordinates are advantageously found for the simplified determination of the spatial position of the respective code segment, with one of the coordinates being a main coordinate, which reproduces the position along the relative movement. The main coordinate then represents that value of the spatial position which is compensated in accordance with the invention with respect to a relative movement between the bar code and the bar code reader.

In accordance with a further advantageous embodiment of the invention, the type of code is in each case determined from the detected code segments and those code segments with corresponding code type are in each case combined. If the determination of the type of code, for example Two/Five interleaved, Code 128 etc., is possible from the detected code segments, then code segments which do not belong to the same type of code can from the outset be classified as not belonging together.

In accordance with a further preferred embodiment, those code segments are combined which, on being combined, result in a bar code with a permissible running length or a code element number, in particular with the running length or the code element number of the scanned bar code. Code segments which, on being combined, would lead to a bar code, the running length of which or code element number of which is smaller or larger than the expected running length or code element number, can thus not be part of the same bar code which is to be recognized.

In accordance with a further advantageous embodiment of the invention, respective code segments are combined, for which the detected code elements at least in the end region of the one code segment correspond with the detected code elements at least in the starting region of the other code segment, with the code segments being so overlappingly combined that the corresponding code elements lie on one another. In this way the more code elements of the code segments which correspond, the greater is the probability of a correct reconstruction of the bar code to be detected.

In accordance with a further preferred embodiment of the invention, each code segment is determined through a multiple reading, with those code segments being combined which, on combination, result in a bar code in which the value of the multiple reading for all code elements exceeds a predetermined minimum value. In this way account is taken of the fact that the probability of recognition for parts of the bar code which are arranged closed to a part which cannot be swept over reduces, so that for the elements arranged in this region, the value of the multiple reading possibly lies beneath the predetermined minimum value. On combination of the corresponding code segments an addition of the values found for the code segments which correspond in the range of overlap results in a multiple reading, so that the probability of a successful reconstruction of the bar code is increased.

In accordance with a further preferred embodiment of the invention, one segment type is determined for each code segment, in particular whether the segment is a start segment, a middle segment or a stop segment. In each case the detected code segments for which the segment types correspond to one another, are combined. If, for example, a start segment and a stop segment corresponding thereto are detected, then the arrangement, i.e. the sequence of the code segments, is given solely by the respective type of segment. On the other hand, a combination can be precluded from the outset on detecting two different code segments of the same segment type, for example on detecting two start segments or two stop segments, or on detecting start and stop segments which do not correspond to one another.

In accordance with a further preferred embodiment of the invention, those code segments are combined which, when combined, result in a bar code with a positive check number evaluation. If the check number evaluation of the bar code that is produced turns out to be negative, then this is not a valid bar code, so that the combination of the corresponding code segments is rejected.

In accordance with the invention, each of the named decision criteria can be used alone or in combination with one or more of the remaining decision criteria in order to combine two or more detected code segments with one another, and thus to obtain a successful reconstruction of the scanned bar code.

Further advantageous embodiments of the invention are set forth in the subordinate claims.

BRIEF DESCRIPTION OF THE DRAWINGS

In the following the invention will be described in more detail with reference to an embodiment and to the drawings, in which are shown.

DESCRIPTION OF THE PREFERRED EMBODIMENTS

Figure 1:
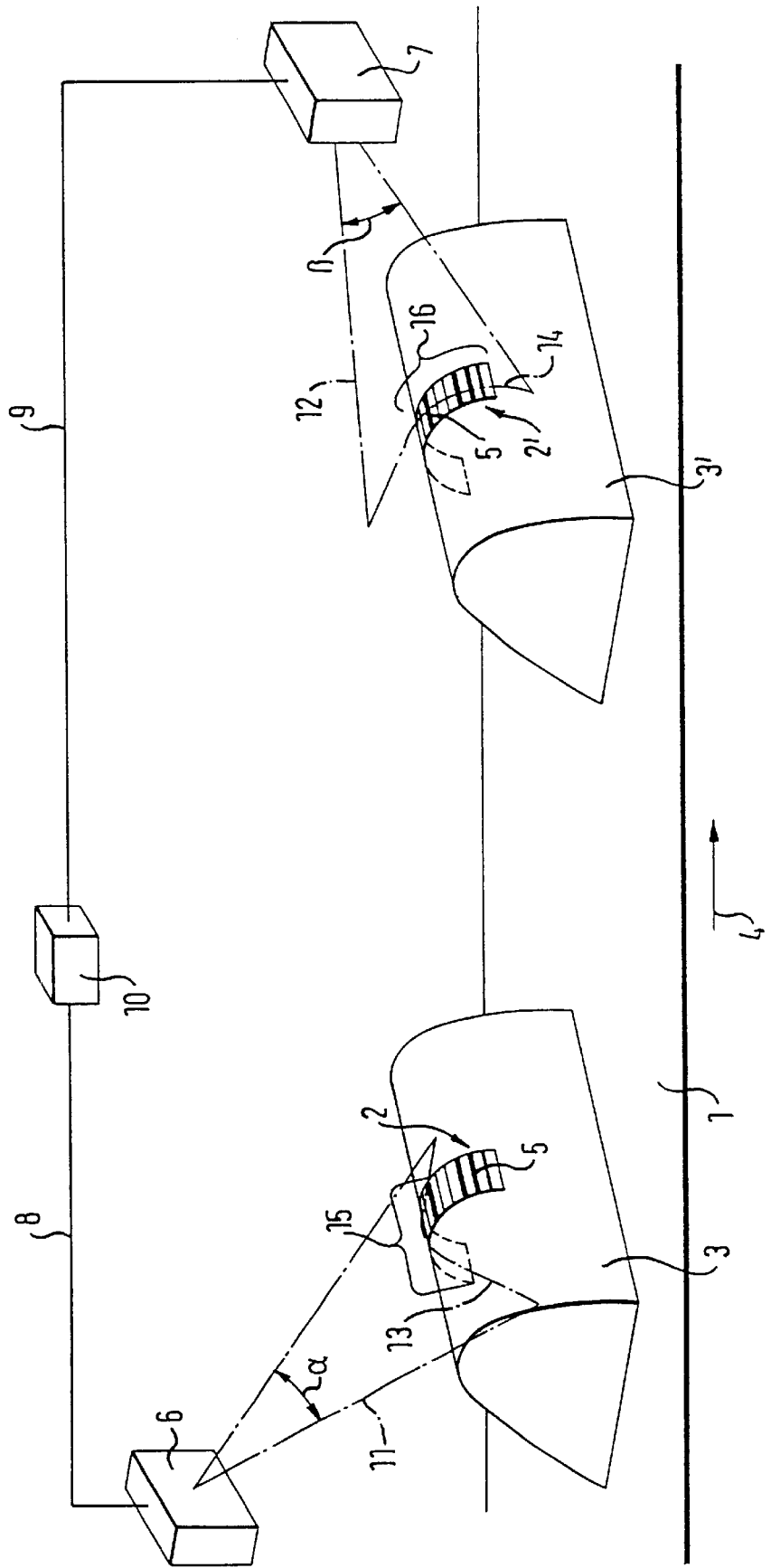
FIG. 1 is a simplified perspective illustration of an object carrying a bar code to be sensed at two different positions in space.

FIG. 1 shows a conveyor belt 1 on which an object 3 carrying a bar code 2 is arranged in a first position. The conveyor belt 1 moves in the direction of an arrow 4, so that the object 3 is transported from its first position shown at the left in FIG. 1 into a second position shown at the right in FIG. 1. For the sake of better understanding, the object 3 and also the bar code 2 will be respectively designated by 3' or 2' in the following when reference is made to the object in its second position.

The bar code 2 comprises a plurality of code elements 5 consisting of bars and gaps and is arranged on a curved surface of the object 3, so that it extends from a rear side of the object 3 over the curvature onto the front side in FIG. 1.

Above the conveyor belt 1, there are provided two bar code readers 6, 7, with the bar code reader 6 being arranged displaced to the rear in the plane of the drawing, and the bar code reader 7 being displaced to the front in the plane of the drawing. Both bar code readers 6, 7 are connected via electrical lines 8, 9 to a central evaluation unit 10 and have scanning beams 11, 12 which sweep over the conveyor belt 1 in different directions.

The scanning beams 11, 12 are respectively pivoted within the bar code readers 6, 7, for example via a polygonal mirror wheel, through an angle of pivoting $\alpha$ and $\beta$ respectively, so that each scanning beam produces a scanning line on the conveyor belt 1, or on an object located on the conveyor belt, such as will be explained in more detail in the following.

At the time ti, the bar code 2 arranged on the object 3 is detected by the scanning beam 11 and partly swept over along a scanning line 13. The scanning line 13 overlaps with the bar code 2 from its rear end up into its front region. A complete sweep by the scanning beam 11 over the bar code 2, so that the bar code 2 is completely covered over by the scanning line 13, is not possible as a result of the illustrated constellation, since, as a result of the curved arrangement of the bar code 2, its front region can no longer be viewed by the bar code reader 6 arranged in the rear region of the conveyor belt 1.

At a time $t_2$ the object 3 has moved, as a result of the movement of the conveyor belt 1 along the arrow 4, into the position (object 3') in which the bar code 2' is swept over by the scanning beam 12 of the bar code reader 7 along the scanning line 14. As a result of the arrangement of the bar code reader 7 in the front region of the conveyor belt in FIG. 1, the scanning beam 12 sweeps over the section of the bar code 2' pointing to the front side of the conveyor belt 1 along the scanning line 14, while the rear part is not reached by the scanning beam 12 because of the curved arrangement of the bar code 2'.

Figure 2:
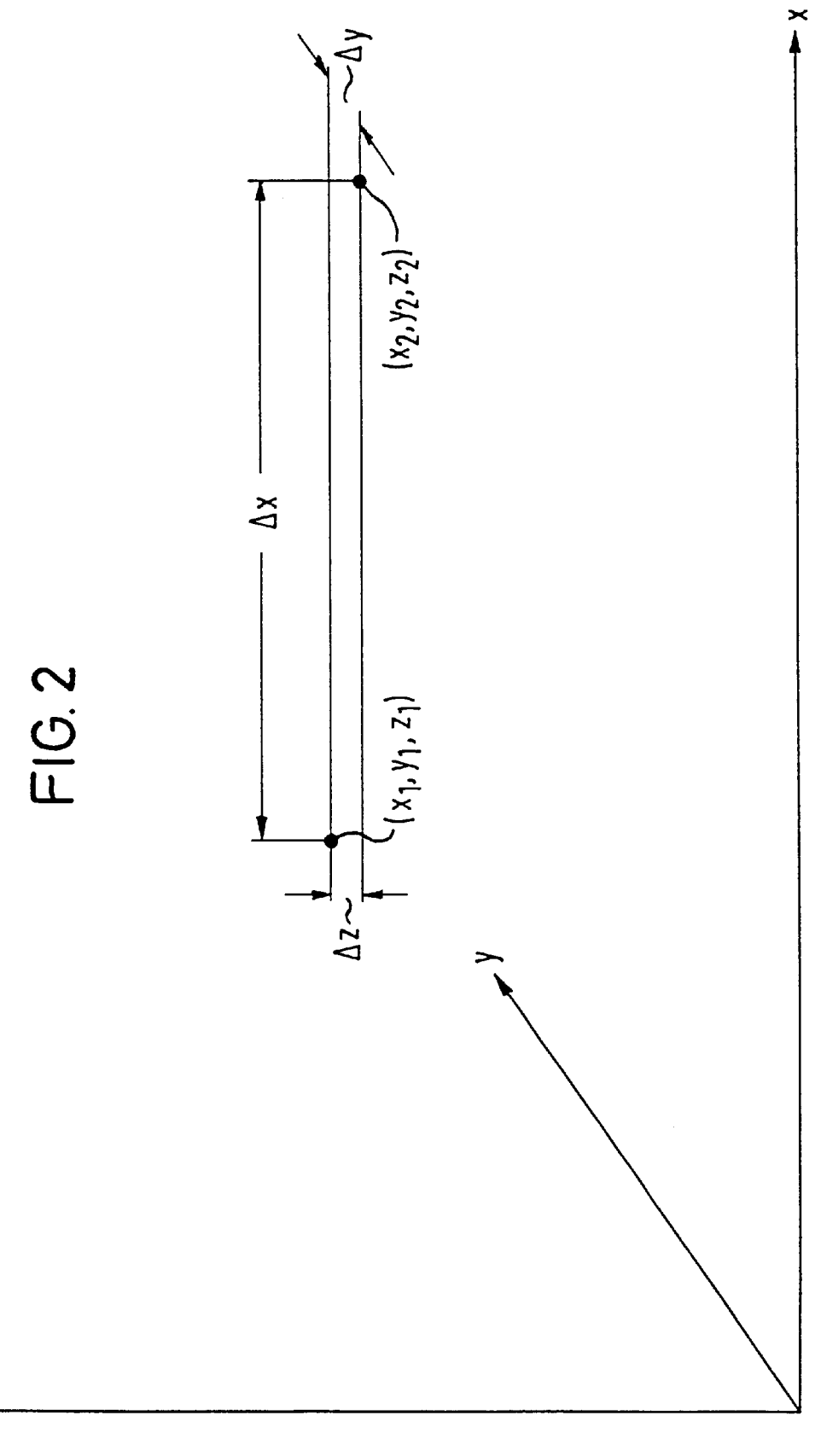
FIG. 2 shows a Cartesian coordinate system, in which the two spatial positions at which respective segments of the bar code of FIG. 1 are detected are shown.

In FIG. 2 the spatial positions of the bar codes 2, 2' are shown at the times $t_1$ and $t_2$. The position of the bar code 2 is represented by the coordinate triple $(x_1, y_1, z_1)$, and the position of the bar code 2' by the coordinate triple $(X_2, y_2, Z_2)$ in a Cartesian coordinate system. In this respect the cartesian coordinate system is so aligned that the X-axis corresponds to the direction of movement of the conveyor belt 1 illustrated by the arrow 4 in FIG. 1, and thus to the direction of movement of the bar code 2, 2'.

From FIG. 2 it is evident that the spatial position of the bar code 2 in the y-and z-direction only changes fractionally by the values $\Delta y$ and $\Delta z$ on movement out of the first position into the second position. The reason for these changes could, for example, be irregularities in the height of the conveyor belt 1. Furthermore, in the determination of the spatial position of the bar code 2 or 2', differences can arise in the y- and z-direction in the positional determination as a result of its finite dimensions. If, for example, the position of the first code element 5 swept over by the scanning beams 11, 13 is used as the z-value, then different z-values result, depending on whether the bar code 2 or 2' is swept over from the top to the bottom or from the bottom to the top. Since the bar codes 2, 2' normally only have relatively small dimensions, which lie in the range of a few centimeters, the possible deviations in the z- and y-direction are, however, relatively small.

In contrast, the positions in the x-direction of the bar code 2 ta the time $t_1$ and of the bar code 2' at the time $t_2$ are clearly different from one another as a result of the movement of the conveyor belt 1 and thus of the bar code 2 and 2' respectively. In this respect the value of the shift Δx depends on the speed of the conveyor belt 1 and the time interval Δt Δt-$t_2$-$t_1$ between the two scanning time points.

In order to be able to unambiguously associate the regions of the bar code 2 and 2' detected at the two different times $t_1$ and $t_2$ at different locations ($x_1$, $y_1$, $z_1$) and ($x_2$, $y_2$, $z_2$) with the same bar code, the following method steps are carried out in accordance with the invention:

Each bar code reader 6, 7 is formed to determine the spatial position of the sensed object. For this purpose the position of each bar code reader 6, 7 within a predetermined Cartesian coordinate system, and also its alignment with respect to the three coordinate axes, is, for example, determined as a preliminary. Furthermore, the bar code readers 6, 7 are designed to determine the reading distance to a scanned object, so that the spatial position of a scanned object within the predetermined coordinate system can be determined from the position and orientation data of the respective bar code readers 6, 7 and also from the reading distance that is found.

Furthermore, an incremental clock signal is started at the reference time to, with the frequency of the clock signal corresponding to the speed of movement of the conveyor belt 1 and preferably being binary coded.

At the time $t_i$ the rear part of the bar code 2 is swept over by the scanning beam 3, with the region of the bar code 2 swept over by the scanning line 13 being detected as a code segment 15. At the same time as the detection, the bar code reader 6 determines the spatial position of the detected code segment 15 and also the actual count $i_1$ of the incremental clock signal at the time $t_i$. Both the detected code segment 15 and also the spatial position of the bar code 2, and also the count $i_1$ of the incremental clock signal, are transferred from the bar code reader 6 via the line 8 to the central evaluation unit 10. In this respect the scanned code elements 5 of the code segment 15 can already be decoded by the bar code reader 6, so that the decoded marks can be transferred to the central evaluation unit 10. It is, however, also possible to transfer the content of the code segment 15 undecoded to the evaluation unit 10. By way of example, the running lengths of the scanned code elements 5 can be transferred, or the code elements can be directly transferred, as graphic pixel information (Bitmap).

At the time $t_2$ the region of the bar code 2' disposed at the front in FIG. 1 is swept over by the scanning beam 12 of the bar code reader 7, with the code elements 5 of the bar code 2' covered by the scanning line 14 being detected as the code segment 16. Simultaneously with the detection of the code element 16, the spatial position ($x_2$, $y_2$, $z_2$) of the code segment 16 and also the count $i_2$ of the incremental clock signal at the time $t_2$ are found by the bar code reader 7. The content of the code segment 16 and also its position and the count $i_2$ that have been found are transmitted via the line 9 to the central evaluation unit 10.

In the central evaluation unit 10 the x-coordinates $x_1$, $x_2$ of the code segments 15, 16 are first freed of the path components caused by the movement of the conveyor belt 1 by the formation of the differences $x_1-i_1$ and $x_2-i_2$. If the x-components of the positions of the code segments 15, 16 only differ from one another as a result of the movement of the conveyor belt 1, then this deviation is compensated for by the formation of the difference values, so that the resulting compensated x-coordinates are of substantially the same size.

After this compensation the cleaned-up positions of the code segments 15, 16 are compared to one another in that the corresponding coordinates of the positions are respectively supplied to a comparator. If the coordinates compared with one another correspond within predetermined limiting values, then the code segments 15, 16 are classified as parts of the same bar code 2, 2' and are combined by the central evaluation unit 10 to form a total bar code.

In order to enable the most reliable reconstruction of the original bar code 2, further decision criteria, which will be described in the following, can be checked in accordance with the invention. In this respect the determination of the described values can be carried out in each case either by the bar code readers 6, 7 or by the central evaluation unit 10. If the determination of the described values is carried by the bar code readers 6, 7, then the values that are found are transferred to the central evaluation unit 10, where the further evaluation of these values takes place.

In order to increase the decoding reliability, the type of code (2/5 Interleaved, Code 128 etc.) of the detected code segments 15, 16 is determined. Only when the code type of the detected code segments 15, 16 correspond, can these be parts of the same original bar code 2, so that a correspondence of this kind is checked as a necessary criterion for the reconstruction of the bar code.

Furthermore, the detected code segments 15, 16 are checked for identical regions, in particular start and end regions, and on recognizing identical ranges, are overlappingly combined so that the recognized identical ranges come to lie on one another. The running length or the number of code elements is determined from the resulting bar code and is compared with the expected running length or the expected number of code elements. If the running length or the bar code number of the reconstructed bar code differ from the corresponding expected values, then the reconstructed bar code is classified as invalid.

In a further method step the segment type of the detected code segment 15, 16 is in each case determined, and in the present case the code segment 15 is classified as a start segment, and the code segment 16 is a stop segment. If the start mark contained in the start segment and the stop mark contained in the stop segment are corresponding end markings, then a further condition for the combination of the code segments 15, 16 to form a unitary bar code is satisfied.

In the following the method of the invention will be explained with reference to a bar code 2, with the bar code content "1234567890" of the code type 2/5 Interleaved:

During the scans the following values were found for the code segments 15 and 16 by the bar code readers 6, 7 at the times $t_i$ and $t_2$:

|  | code segment 15 | code segment 16 |
|---|---|---|
| code type | 2/5 Interleaved | 2/5 Interleaved |
| content | 12345678 | 567890 |
| multiple reading of individual marks | 55554431 | 112234 |
| segment type | start segment with start mark | stop segment with stop mark |
| x-coordinate | 400 mm | 500 mm |
| y-coordinate | 22 mm | 20 mm |
| z-coordinate | 48 mm | 50 mm |
| count of the incremental signal | 200 mm | 300 mm |

The checking of the described decision criteria then leads to the following result:

1. The code type of the code segments 15, 16 is identical.

2. The content of the code segments comprises the identical part regions "5, 6, 7, 8". With corresponding overlapping combination a sought code length "10" results, which corresponds with the code length sought.

3. On combining the code segments, a total multiple reading profile of "5555555334" results. Thus, a required multiple reading per mark of at least three is satisfied.

4. The code segments contain start and stop marks which match with one another.

5. The x-coordinate of the code segment 15 cleaned up by the displacement path amounts to 400 mm−200 mm=200 mm. The x-coordinate of the code segment 16 cleaned up by the displacement path amounts to 500 mm−300 mm=200 mm. Thus, the compensated x-coordinates of the code segments 15, 16 correspond.

6. The x-coordinates 15 and 16 differ only by 2 mm, so that the distinctions lie in the tolerance range of, for example, 5 mm.

7. The z-coordinates of the code segments 15 and 16 are likewise distinguished by 2 mm. In this case the difference also lies within the tolerance range.

All the predetermined decision criteria are thus positively assessed so that the reconstructed bar code of "1234567890" results and a reconstruction is thus successful.

What is claimed is:

1. Method of reading a bar code consisting of a predetermined number of sequential code elements for generating a binary signal with sequential high/low phases, lengths of which correspond to widths of the sequential code elements, characterized in that the bar code is sensed by at least two scanning beams from different directions along different scanning lines, in that at least some of the regions of the bar code scanned by a scanning beam and each representing only an incomplete part of the scanned bar code are respectively detected as a code segment, in that at least some of the detected code segments are selected with respect to predetermined decision criteria and combined for the reconstruction of the scanned bar code, and in that for each detected code segment the code segment's spatial position is in each case determined at the time of the code segment's scanning, and code segments are recognized as parts of the same scanned bar code and combined in dependence on determined positions.

2. Method in accordance with claim 1, characterized in that the scanning beams are transmitted from different bar code readers which are spatially separated from one another.

3. Method in accordance with claim 1, characterized in that the scanning beams are produced and transmitted by a bar code reader by at least one of division and deflection of the scanning beam.

4. Method in accordance with claim 1, characterized in that the detected code segments are supplied to a central evaluation unit, through which decision criteria are checked and the code segments selected as a result of the check are combined.

5. Method in accordance with claim 4, characterized in that the detected code segments are supplied to a central evaluation unit in decoded signal form.

6. Method in accordance with claim 4, characterized in that the detected code segments are supplied to a central evaluation unit in coded form.

7. Method according to claim 6 wherein the detected code is supplied to the central evaluation unit in the form of the running length of the sequential code elements.

8. Method according to claim 6 wherein the detected code is graphically supplied to the central evaluation unit as a pixel representation.

9. Method in accordance with claim 4, characterized in that a bar code reader or one of the bar code readers is used as an evaluation unit.

10. Method in accordance with claim 4, characterized in that the evaluation unit is formed separately from a bar code reader or the bar code readers.

11. Method in accordance with claim 1, characterized in that the detected code segments are combined in all possible combinations and are each investigated to see whether they satisfy predetermined decision criteria.

12. Method in accordance with claim 1, characterized in that the code segments are respectively combined for which the spatial positions correspond within predetermined boundary values.

13. Method in accordance with claim 1, characterized in that a relative movement takes place between the bar code and a bar code reader or the bar code readers, the bar code is moved on a conveyor device, and in that this relative movement is taken into account when determining or evaluating the spatial positions.

14. Method in accordance with claim 13, characterized in that for each detected code segment a distance value is determined for the path of the respective code segment traveled from a reference time point which is the same for all code segments, in each case at the time at which the respectively detected code segment is scanned; and in that the distance value is in each case taken into account in determination or the evaluation of the spatial position of the code segments and is in each case subtracted from a component of the determined spatial position parallel to a direction of movement.

15. Method in accordance with claim 14, characterized in that an incremental clock signal is started at a reference time point, and the incremental count is used at the time point of the scan as the distance value.

16. Method in accordance with claim 13, characterized in that three cartesian position coordinates are found for determination of the spatial position, with one of the coordinates being a main coordinate reciting the position along the relative movement.

17. Method in accordance with claim 1, characterized in that the type of code is in each case determined from the detected code segments, and detected code segments with a corresponding code type are combined.

18. Method in accordance with claim 1, characterized in that the code segments are combined so that their combination results in a bar code with a permissible running length or number of code elements.

19. Method in accordance with claim 1, characterized in that respective code segments are combined for which the detected code elements, at least in an end region of one code segment, correspond to the detected code elements, at least in a starting region of another code segment, with the code elements being overlappingly combined so that the corresponding code elements lie on one another.

20. Method in accordance with claim 1, characterized in that each code segment is found by a multiple reading and in that code segments are combined which, when combined, result in a bar code in which a value of the multiple reading exceeds a predetermined minimum value for all code elements.

21. Method in accordance with claim 1, characterized in that for each code segment a determination is made whether the code segment is a start segment, a middle segment or a stop segment, and in that detected code segments of corresponding segment type are combined.

22. Method in accordance with claim 21, characterized in that the code segments are combined for reconstruction of the scanned bar code so that the start segment is arranged at the start, one or more middle segments is/are arranged at the middle, and the stop segment is arranged at the end of the reconstructed bar code.

23. Method in accordance with claim 1, characterized in that code segments are combined which, when combined, result in a bar code with a positive test number evaluation.

24. Method in accordance with claim 1, characterized in that the reconstructed bar code is decoded.

* * * * *